United States Patent
Yokota et al.

(10) Patent No.: US 12,434,449 B2
(45) Date of Patent: Oct. 7, 2025

(54) FIBER-REINFORCED RESIN PULTRUDED PRODUCT AND METHOD FOR PRODUCING SAME

(71) Applicant: KURASHIKI BOSEKI KABUSHIKI KAISHA, Kurashiki (JP)

(72) Inventors: Katsuhiko Yokota, Osaka (JP); Tadaharu Tanaka, Osaka (JP); Yoichi Hiraishi, Osaka (JP)

(73) Assignee: Kurashiki Boseki Kabushiki Kaisha, Okayama (JP)

( * ) Notice: Subject to any disclaimer, the term of this patent is extended or adjusted under 35 U.S.C. 154(b) by 83 days.

(21) Appl. No.: 18/247,714

(22) PCT Filed: Oct. 4, 2021

(86) PCT No.: PCT/JP2021/036641
§ 371 (c)(1),
(2) Date: Apr. 3, 2023

(87) PCT Pub. No.: WO2022/075265
PCT Pub. Date: Apr. 14, 2022

(65) Prior Publication Data
US 2024/0001631 A1  Jan. 4, 2024

(30) Foreign Application Priority Data
Oct. 6, 2020  (JP) .................................. 2020-168947

(51) Int. Cl.
*B29C 70/52* (2006.01)
(52) U.S. Cl.
CPC .......... *B29C 70/521* (2013.01); *B29C 70/526* (2013.01); *B29C 70/528* (2013.01)
(58) Field of Classification Search
CPC ... B29C 70/521; B29C 70/526; B29C 70/528; B29C 70/52
See application file for complete search history.

(56) References Cited

U.S. PATENT DOCUMENTS

2005/0215148 A1  9/2005 Werner
2009/0050263 A1  2/2009 Suzuki et al.
(Continued)

FOREIGN PATENT DOCUMENTS

CN  101394988  3/2009
CN  101959674  1/2011
(Continued)

OTHER PUBLICATIONS

International Search Report issued in International Application No. PCT/JP2021/036641, Oct. 26, 2021, 5 pages w/ translation.
(Continued)

Primary Examiner — Daniel McNally
(74) Attorney, Agent, or Firm — HSML P.C.

(57) ABSTRACT

Provided is a fiber-reinforced resin pultruded product obtained by molding a fiber sheet, wherein the fiber sheet is a semi-preg sheet in which a thermoplastic resin serving as a matrix for the pultruded product is fused to at least a fiber surface, and, in the fiber-reinforced resin pultruded product, the fiber sheet has been pultruded, and the thermoplastic resin fills an inside of the fiber sheet and spaces between overlapping portions of the fiber sheet and is integrated with the fiber sheet. A molded product 40 is molded by converging a fiber sheet 33 and feeding the fiber sheet into a heating section 34 of a pultrusion die 37; compressing the fiber sheet while heating the fiber sheet to a temperature equal to or above the melting point or a resin flow temperature of the thermoplastic resin in the heating section 34; molding the fiber sheet in a molding section 35; cooling the fiber sheet in a cooling section 36 to obtain a pultruded product; and pulling the pultruded product out of the pultrusion die 37 using pulling rollers 38a and 38b.

11 Claims, 8 Drawing Sheets

(56) References Cited

U.S. PATENT DOCUMENTS

| | | |
|---|---|---|
| 2010/0215887 A1 | 8/2010 | Kawabe |
| 2011/0048624 A1 | 3/2011 | Nitsch |
| 2016/0159998 A1 | 6/2016 | Spencer et al. |
| 2022/0001630 A1 | 1/2022 | Shigenari et al. |

FOREIGN PATENT DOCUMENTS

| | | |
|---|---|---|
| CN | 101466535 B | 5/2013 |
| CN | 105531307 | 4/2016 |
| EP | 0 521 161 | 1/1993 |
| JP | 5-050434 | 3/1993 |
| JP | 7-023679 | 1/1995 |
| JP | 09-150463 | 6/1997 |
| JP | 09150463 A * | 6/1997 |
| JP | 10-067052 | 3/1998 |
| JP | 2007-001299 | 1/2007 |
| JP | 2016-172870 | 9/2016 |
| JP | 2018-149769 | 9/2018 |
| JP | 2020-136926 | 7/2020 |
| JP | 2020-131466 | 8/2020 |
| WO | 2020-136926 | 7/2020 |

OTHER PUBLICATIONS

Office Action issued in corresponding Japanese Patent application No. 2022-555471, Sep. 5, 2024, 8 pages with translation.

Extended European Search Report issued in corresponding European Patent Application No. 21877564.1, Sep. 27, 2024, 7 pages.

Ohno, et al., "Development of Innovative Molding Processes for Carbon Fiber Reinforced Thermoplastics Using Semi-preg," JSW Technical Review, No. 66 (2015), pp. 129-134 w/partial English translation.

* cited by examiner

FIBER-REINFORCED RESIN PULTRUDED PRODUCT AND METHOD FOR PRODUCING SAME

TECHNICAL FIELD

The present invention relates to a fiber-reinforced resin pultruded product in which a semi-preg sheet is used and a method for producing the same.

BACKGROUND ART

Linear objects made of resin materials are used in various fields and applications, and there is a growing demand for stronger and more shock-resistant fiber-reinforced resin composites. In particular, carbon fibers are combined with various matrix resins to develop linear objects.

Linear objects in which thermosetting resins are used are easy to process, but have problems such as a slow molding speed, brittleness, and difficulty of secondary processing. On the other hand, thermoplastic resins have a fast molding speed, toughness, and ease of secondary processing, and therefore, fiber-reinforced resin linear objects in which thermoplastic resins are used are attracting attention.

However, thermoplastic resins are highly viscous, which makes it difficult for a fiber bundle to be impregnated with a thermoplastic resin. To address this issue, a number of techniques for molding a linear object and for resin impregnation have been proposed. Patent Document 1 proposes a technique in which reinforcing fibers aligned in the form of a sheet are impregnated with a thermoplastic resin to obtain a prepreg sheet, and the prepreg sheet is divided by a divider and molded into a rod shape. Patent Document 2 proposes a technique in which a carbon fiber prepreg in sheet form is rolled up from an end portion thereof, and also proposes a technique in which carbon fibers are wound around an outer circumference of a carbon fiber bundle using a filament winding machine. Patent Document 3 proposes a technique in which a fiber bundle is bound together using a binding material and then dipped into a thermoplastic resin solution to produce a wire rod. Patent Document 4 proposes a technique in which a unidirectional woven fabric is molded into a rod shape by folding end portions of the woven fabric.

PRIOR ART DOCUMENTS

Patent Documents

[Patent Document 1] JP H5-50434A
[Patent Document 2] JP H7-23679A
[Patent Document 3] JP 2016-172870A
[Patent Document 4] JP 2007-1299A

DISCLOSURE OF INVENTION

Problem to be Solved by the Invention

However, there are problems with the above-described conventional techniques. For a method in which a roving is directly impregnated with a liquefiable thermoplastic resin, the liquefiable resins are limited. For a method in which a prepreg sheet is used, since the prepreg sheet itself is hard, a step of heating and thereby softening the sheet, or a step of slitting the sheet into strips with a narrow width and stacking the strips into a multilayer structure, is needed. In addition, due to the high cost of the prepreg sheet itself, and furthermore the necessity for the slitting step, the cost and the production speed (productivity) are problems.

In order to solve the above-described problems of the conventional techniques, the present invention provides a fiber-reinforced resin pultruded product in which an easy-to-handle and flexible semi-preg sheet is used and that has excellent molding processability and enables continuous molding of a molded product, as well as a method for producing the fiber-reinforced resin pultruded product.

Means for Solving Problem

A fiber-reinforced resin pultruded product of the present invention is a fiber-reinforced resin pultruded product obtained by molding a fiber sheet, wherein the fiber sheet is a semi-preg sheet in which a thermoplastic resin serving as a matrix for the pultruded product is fused to at least a fiber surface, and, in the fiber-reinforced resin pultruded product, the fiber sheet has been pultruded, and the thermoplastic resin fills an inside of the fiber sheet and spaces between overlapping portions of the fiber sheet and is integrated with the fiber sheet.

A method for producing a fiber-reinforced resin pultruded product of the present invention is a method for producing a fiber-reinforced resin pultruded product in which a fiber sheet is used, the fiber sheet being a semi-preg sheet in which a thermoplastic powder resin serving as a matrix is fused to at least a fiber surface, the method including:

converging the fiber sheet and feeding the fiber sheet into a heating section of a pultrusion die;

compressing the fiber sheet while heating the fiber sheet to a temperature equal to or above a melting point or a resin flow temperature of the thermoplastic resin in the heating section;

molding the fiber sheet in a molding section of the pultrusion die;

cooling the fiber sheet in a cooling section of the pultrusion die to obtain a pultruded product; and pulling out the pultruded product.

Effects of the Invention

In the fiber-reinforced resin pultruded product of the present invention, the fiber sheet has been converged and pultruded, and the thermoplastic resin fills the inside of the fiber sheet and the spaces between the overlapping portions of the fiber sheet and is integrated with the fiber sheet. In addition, with use of an easy-to-handle and flexible semi-preg sheet, it is possible to provide a fiber-reinforced resin pultruded product that has excellent molding processability and enables continuous molding of a molded product, as well as a method for producing such a fiber-reinforced resin pultruded product. That is to say, since a highly flexible, non-impregnated and/or semi-impregnated semi-preg sheet is used for a pultruded product made of a fiber-reinforced resin according to the present invention, the pultruded product has good pultrusion moldability, and continuous molding of a molded product can be realized. Moreover, the production method of the present invention is a versatile molding method and enables the molding of molded products with various shapes. Furthermore, pultruded products in which a thermoplastic resin is used as a matrix resin have good secondary processability and can be processed easily into curvilinear objects, or parts such as rivets.

DESCRIPTION OF THE INVENTION

The present invention relates to a fiber-reinforced resin pultruded product in which a fiber sheet is used. The fiber sheet is a semi-preg sheet in which a thermoplastic powder resin serving as a matrix for the pultruded product is fused to at least a fiber surface. In the fiber-reinforced resin pultruded product of the present invention, the fiber sheet has been pultruded in a converged state, and the thermoplastic resin fills the inside of the fiber sheet and spaces between overlapping portions of the fiber sheet and is integrated with the fiber sheet. It is sufficient that the fiber sheet is a semi-preg sheet, and a unidirectional continuous fiber sheet, a multidirectional fiber sheet, a woven fabric, a knitted fabric, and the like may be used. As used herein, the term "fill" means that the thermoplastic resin permeates into the fiber sheet and occupies the spaces between the overlapping portions of the fiber sheet.

Inside the fiber-reinforced resin pultruded product, the fiber sheet is preferably folded into an irregular shape. Once the fiber sheet is molded by converging and pulling the fiber sheet through a die, the fiber sheet inside the molded product is folded into an irregular shape, and the inside of the fiber sheet and the spaces between the overlapping portions of the fiber sheet are filled with the thermoplastic resin. Thus, the molded product is solid, with reduced voids. When the fiber sheet inside the fiber-reinforced resin pultruded product is folded into an irregular shape, the molded product has a non-directional and uniform stress property The fiber-reinforced resin pultruded product has a pultrusion mark on its surface. Also, at least some of the fibers constituting the fiber sheet are present on the surface. When a fiber sheet is molded by converging and pulling the fiber sheet through a die, a pultrusion mark is left on the surface of the resulting molded product, enabling the determination of whether or not pultrusion has been performed.

Preferably, the ratio (Vf) of the volume of fibers in the fiber sheet used in the present invention is 25 to 70 vol %, and the ratio of the thermoplastic resin is 30 to 75 vol %. More preferably, the ratio of the fibers (Vf) is 30 to 60 vol %, and the ratio of the resin is 40 to 70 vol %. This allows the resin component of the fiber sheet to be directly used as a matrix resin component of the molded product, and eliminates the necessity of adding a new resin when producing the molded product.

The fiber-reinforced resin pultruded product of the present invention is continuous or is cut to a predetermined length. The cross-sectional diameter, or thickness, thereof is preferably 0.2 to 15 mm, and more preferably 1 to 10 mm. The cross-sectional shape thereof may be any shape, such as a round shape, a rectangular shape, a C shape, an H shape, or an L shape. This molded product may be linear, rod-shaped, or plate-shaped, for example.

Preferably, the fiber sheet used in the present invention includes bridging fibers extending in a direction in which the bridging fibers cross the unidirectional continuous fibers, and the thermoplastic resin integrates the unidirectional continuous fibers with the bridging fibers. The fibers constituting the fiber sheet are mainly composed of unidirectional continuous fibers that are spread and aligned in parallel in one direction. Preferably, the fibers are secondarily composed of bridging fibers that are arranged in a direction in which the bridging fibers cross the unidirectional continuous fibers. Preferably, the thermoplastic resin is a powder, and adheres to the unidirectional continuous fibers and the bridging fibers from above, is thermally fused to at least the surface of the unidirectional continuous fibers, and integrates the unidirectional continuous fibers with the bridging fibers. Since the unidirectional continuous fibers and the bridging fibers are integrated by the thermally fused thermoplastic resin, this sheet has favorable handleability and also has good operability during the converging, pulling, and thermal molding.

The fiber sheet is preferably a semi-preg sheet obtained by attaching and thermally fusing the thermoplastic powder resin, which serves as the matrix for the pultruded product, to the surface of the unidirectional continuous fibers. As a result of molding this semi-preg sheet, the thermoplastic resin present on the surface of the semi-preg sheet fills the inside of the fiber sheet and the spaces between the overlapping portions of the fiber sheet. Thus, a molded product with excellent shapeability (moldability) and reduced voids can be obtained.

When the total of the unidirectional continuous fibers and the bridging fibers is 100 mass %, the unidirectional continuous fibers preferably account for 75 to 99 mass %, more preferably 80 to 97 mass %, and even more preferably 85 to 97 mass %. Also, the bridging fibers preferably account for 1 to 25 mass %, more preferably 3 to 20 mass %, and even more preferably 3 to 15 mass %. When the above-described ranges are satisfied, a fiber sheet with high integrity and high tensile strength in the width direction can be obtained. The average length of the bridging fibers is preferably 1 mm or more, and more preferably 5 mm or more. The upper limit of the average length of the bridging fibers is preferably 1000 mm or less, and more preferably 500 mm or less. When the average length of the bridging fibers is within the above-described range, a fiber sheet with high strength in the width direction and excellent handleability can be obtained.

The mass of the fiber sheet per unit area is preferably 10 to 500 g/m², more preferably 20 to 400 g/m², and even more preferably 30 to 300 g/m². When the above-described range is satisfied, the fiber sheet is easy to handle in converging and pultruding the fiber sheet.

The fiber sheet used in the present invention may also include an auxiliary yarn arranged in a direction different from the direction of the unidirectional continuous fibers. The auxiliary yarn maintains a fixed orientation of the fiber sheet. Examples of the auxiliary yarn include a glass fiber, an aramid fiber, a polyester fiber, a nylon fiber, a vinylon fiber, and the like.

At least one selected from a carbon fiber, a glass fiber, and a highly elastic fiber with an elastic modulus of preferably 380 cN/dtex or more is preferred for the fibers of the fiber sheet. Examples of the highly elastic fiber include an aramid fiber, in particular, a para-aramid fiber (elastic modulus: 380 to 980 cN/dtex); a polyarylate fiber (elastic modulus: 600 to 741 cN/dtex); a heterocyclic polymer (PBO, elastic modulus: 1060 to 2200 cN/dtex) fiber; a high molecular weight polyethylene fiber (elastic modulus: 883 to 1413 cN/dtex); a polyvinyl alcohol fiber (PVA, strength: 14 to 18 cN/dtex); and the like. These fibers are useful as resin-reinforcing fibers. A carbon fiber is especially useful.

The single sheet thickness of the fiber sheet is preferably 0.01 to 2.0 mm, more preferably 0.02 to 1 mm, and even more preferably 0.05 to 0.5 mm. When the above-described range is satisfied, the fiber sheet is easy to handle in converging and pultruding the fiber sheet.

Examples of resins that can be used as the thermoplastic resin include, but are not limited to, polyamide-based resin, polycarbonate-based resin, polypropylene-based resin, polyester-based resin, polyethylene-based resin, acrylic-based resin, phenoxy-based resin, polystyrene-based resin, polyimide-based resin, and polyetheretherketone-based resin.

The thermoplastic resin is in a powder state, and the powder is a collection of fine particles, grains, and the like. The powder is preferably dry powder.

Next, a method for producing a fiber-reinforced resin pultruded product of the present invention will be described. A semi-preg sheet in which a thermoplastic powder resin serving as a matrix for the pultruded product is fused to at least the fiber surface is used, and the method includes the following steps:

(1) a feeding step of converging the fiber sheet and feeding the fiber sheet into a heating section of a pultrusion die;
(2) a heating and compressing step of compressing the fiber sheet using a pulling force while heating the fiber sheet to a temperature equal to or above the melting point or a resin flow temperature of the thermoplastic resin in the heating section of the pultrusion die;
(3) a molding step of molding the fiber sheet in a molding section of the pultrusion die;
(4) a cooling step of cooling the fiber sheet in a cooling section of the pultrusion die to obtain a pultruded product; and
(5) a pulling step of pulling the pultruded product out of the pultrusion die.

In the feeding step, one or two or more fiber sheets are used. It is preferable that a fiber sheet is fed into the heating section while being in at least one converged state selected from a folded state, a rolled-up state, and a state in which strip-shaped sheets are stacked. In this manner, the planar fiber sheet can be made closer to a three-dimensional molded product having a rod shape or the like. In particular, in the case of feeding a stack of strip-shaped fiber sheets, if the strip-shaped sheets are fed while being staggered in the length direction, an endless pultruded product with an unlimited length can be obtained. As a fiber sheet converging means, a guide or the like can be used. Moreover, when converging the fiber sheet, it is possible to set the direction of fiber orientation to any desired angle. Note that "converging" as used herein means gathering or bundling the fiber sheet into a moldable state. For example, this means folding the fiber sheet, rolling up the fiber sheet, or stacking the strip-shaped sheets.

When a rolled sheet is used, a sheet may be further rolled around the rolled sheet. The sheet can be rolled up at any angle. Fiber sheets may be stacked, and the stacking can be performed at any angle, such as 0°, 45°, and 90°. Usually, the stacking is based on a fiber sheet at 0°, that is, in the longitudinal direction (one direction). "0°" means that the longitudinal direction of the unidirectional continuous fibers of the fiber sheet is the same as the pulling direction of the pultrusion (longitudinal direction of the resulting molded product). The amount of insertion of the semi-preg sheet can be changed according to the target diameter and mass per unit length of the molded product.

In the heating and compressing step, it is preferable that the temperature at which the fiber sheet is heated is, for example, equal to or above the resin melting temperature, and the pulling speed is 10 mm/min to 20 m/min. The melting of the resin, the impregnation of spaces between the fibers with the resin, and the molding can be controlled using two conditions, the temperature and the pulling speed. An inner space of the heating section preferably has a tapered shape, a trumpet shape, or other shapes such that the diameter of the inner space decreases in the direction in which the fiber sheet is advanced. That is to say, it is preferable that the diameter (D1) of an inlet of the heating section is larger than the target diameter, and the diameter (D2) of an outlet of the heating section and the diameter (D3) of the molding section are the same as the target diameter. The pultrusion die is also referred to as a die.

As an example, the outlet diameter (D2) of the heating section and the diameter (D3) of the molding section are 1 to 15 mm. The inlet diameter (D1) of the heating section/the outlet diameter (D2) of the heating section is preferably 1.5 times or greater, more preferably 2 times or greater, and even more preferably 2.5 times or greater. There is no upper limit for D1/D2, but practically, D1/D2 is preferably 10 times or less, and more preferably 8 times or less. The fiber sheet, which is the raw material, is compressed using the pulling force, or in other words, compressed while being pulled in the advancing direction, and the amount of compression corresponds to the above-described ratio. The compression results in a dense molded product with few voids inside the molded product. The diameter (D4) of a die of the cooling section is preferably the same as the outlet diameter (D2) of a die of the heating section.

It is preferable that the steps from the feeding step to the pulling step are performed as a continuous process. When these steps are performed continuously, a high production efficiency and a low production cost can be achieved.

Along fiber-reinforced resin pultruded product that is obtained once the cooling step is complete can be continuously taken up if the pultruded product is thin enough to be taken up, or can be cut to a predetermined length.

The method for producing a pultruded product of the present invention is characterized by directly molding a semi-preg sheet. Unlike a prepreg sheet, the fiber sheet (semi-preg sheet) used in the present invention is flexible and therefore has excellent shapeability, and can be inserted into the heating section. In other words, a prepreg is hard and therefore cannot be made into a folded structure. A semi-preg sheet in the form of a film stack or the like is not preferable in terms of shapeability. In the method for producing a wire rod disclosed in Patent Document 3, in which a fiber bundle is bound together using a binding material and dipped into a thermoplastic resin solution to obtain a wire rod, there are limitations regarding the selection of the thermoplastic resin. In contrast, in the present invention, since a fiber sheet to which a resin adheres is used, there are no limitations on the thermoplastic resin, and any thermoplastic resin used in common molding processes can be used. Therefore, almost all resins can be used. Furthermore, since the fiber sheet used in the present invention has a thermoplastic resin powder that has been dropped onto the surface of the fiber sheet, melt-bonded thereto, and solidified, the heating and melting of the resin and the subsequent cooling can be efficiently performed during the molding, and thus, this molding process can be said to achieve good moldability and a high molding speed.

Figure 1A:
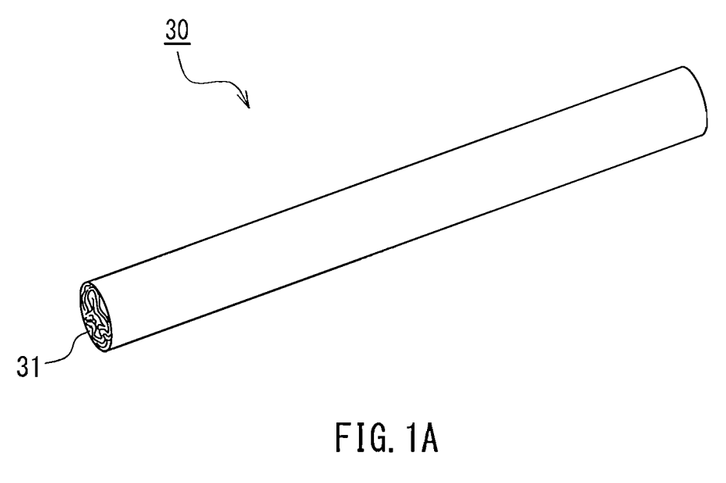
FIG. 1A is a schematic perspective view of a fiber-reinforced resin pultruded product according to an embodiment of the present invention.
Figure 1B:
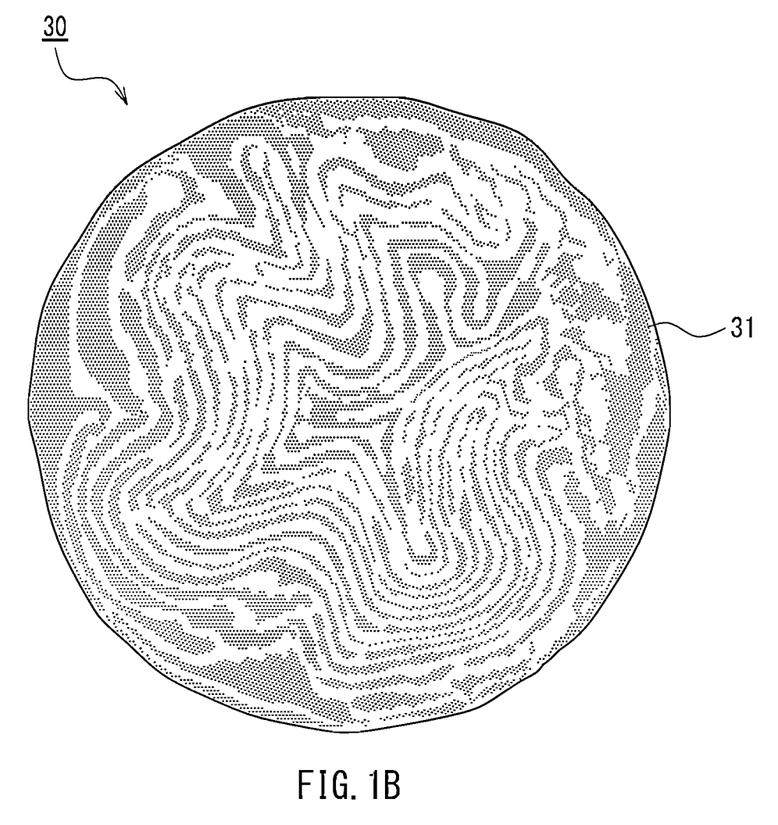
FIG. 1B is a schematic cross-sectional view thereof.

Hereinafter, the present invention will be described using the attached drawings. In the following drawings, the same reference numerals denote the same items. FIG. 1A is a schematic perspective view of a fiber-reinforced resin pultruded product 30 according to an embodiment of the present invention, and FIG. 1B is a schematic cross-sectional view of the fiber-reinforced resin pultruded product 30. The fiber-reinforced resin pultruded product 30 is a rod-shaped molded product, and in a cross section thereof, a fiber sheet is folded into an irregular shape. Also, a thermoplastic resin fills the inside of the fiber sheet and spaces between overlapping portions of the fiber sheet and is integrated with the fiber sheet. In FIG. 1B, a thermoplastic resin 31 is impregnated into the fiber sheet and is also filled into the spaces between the overlapping portions of the fiber sheet, thereby being integrated with the fiber sheet.

Figure 2:
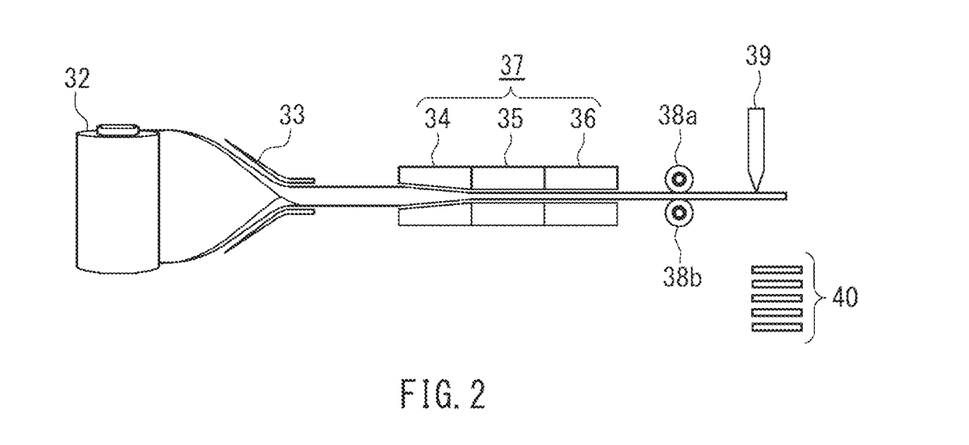
FIG. 2 is a schematic process diagram showing a method for producing a fiber-reinforced resin pultruded product according to an embodiment of the present invention.

FIG. 2 is a schematic process diagram showing a method for producing a fiber-reinforced resin pultruded product according to an embodiment of the present invention. A die 37 is a pultrusion die that includes a heating section, a molding section, and a cooling section in this order in the direction in which a fiber sheet is advanced. A fiber sheet 32 is passed through a guide 33, converged, and fed into a heating section 34 of the die 37. In the heating section 34, the fiber sheet 32 is heated to a temperature equal to or above the melting point or the resin flow temperature of the thermoplastic resin present on at least the surface of the fiber sheet 32. The resin flow temperature refers to a temperature at which the resin begins to flow. In the heating section 34, the fiber sheet is compressed while being pulled in the advancing direction to shape the fiber sheet into the shape of the inner cavity of the heating section 34. Next, the fiber sheet is pulled into the molding section 35, shaped into the shape of an inner cavity of the molding section 35, and stabilized in that shape in the molding section 35. Next, the fiber sheet is cooled in the cooling section 36 to fix the shape. The die temperature of the molding section 35 is set to, for example, a temperature equal to or above the melting point or the resin flow temperature of the thermoplastic resin. Water cooling is an efficient cooling system for the cooling section 36. The resulting molded product is pulled out of the die 37 by pulling rollers 38a and 38b, and is taken up if the molded product is thin, or is cut, using a blade 39, to a fiber-reinforced resin molded product 40 of a predetermined length.

Figure 3A:
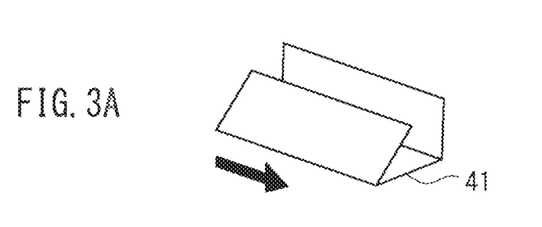
FIG. 3A is a schematic diagram illustrating feeding of a fiber sheet in a folded state in a method for producing a fiber-reinforced resin pultruded product according to an embodiment of the present invention.
Figure 3B:
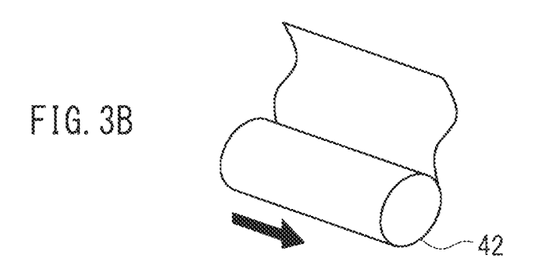
FIG. 3B is a schematic diagram illustrating feeding of a fiber sheet in a rolled-up state in the production method.
Figure 3C:
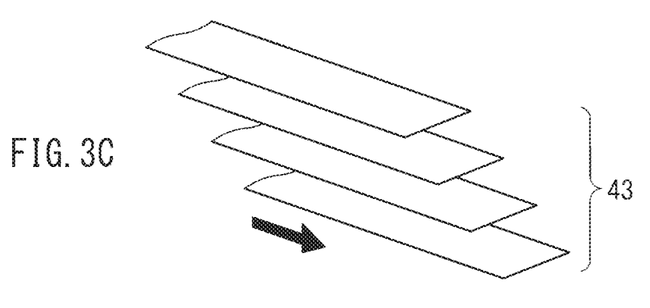
FIG. 3C is a schematic diagram illustrating feeding of a stack of a plurality of fiber sheets cut into a strip shape in the production method.

FIGS. 3A to 3C show examples of the form of the fiber sheet used in the method for producing a fiber-reinforced resin pultruded product according to an embodiment of the present invention, when the fiber sheet is fed into the heating section; FIG. 3A shows a fiber sheet 41 in a folded state, FIG. 3B shows a fiber sheet 42 in a rolled-up state, and FIG. 3C is a fiber sheet 43 in a state in which strip-shaped fiber sheets are stacked. The fiber sheet 42 may be rolled up obliquely. In the case of the fiber sheet 43 in the state in which strip-shaped fiber sheets are stacked, the strip-shaped fiber sheets may be staggered in the length direction, and thus, an endless long molded product can be obtained.

Figure 4:
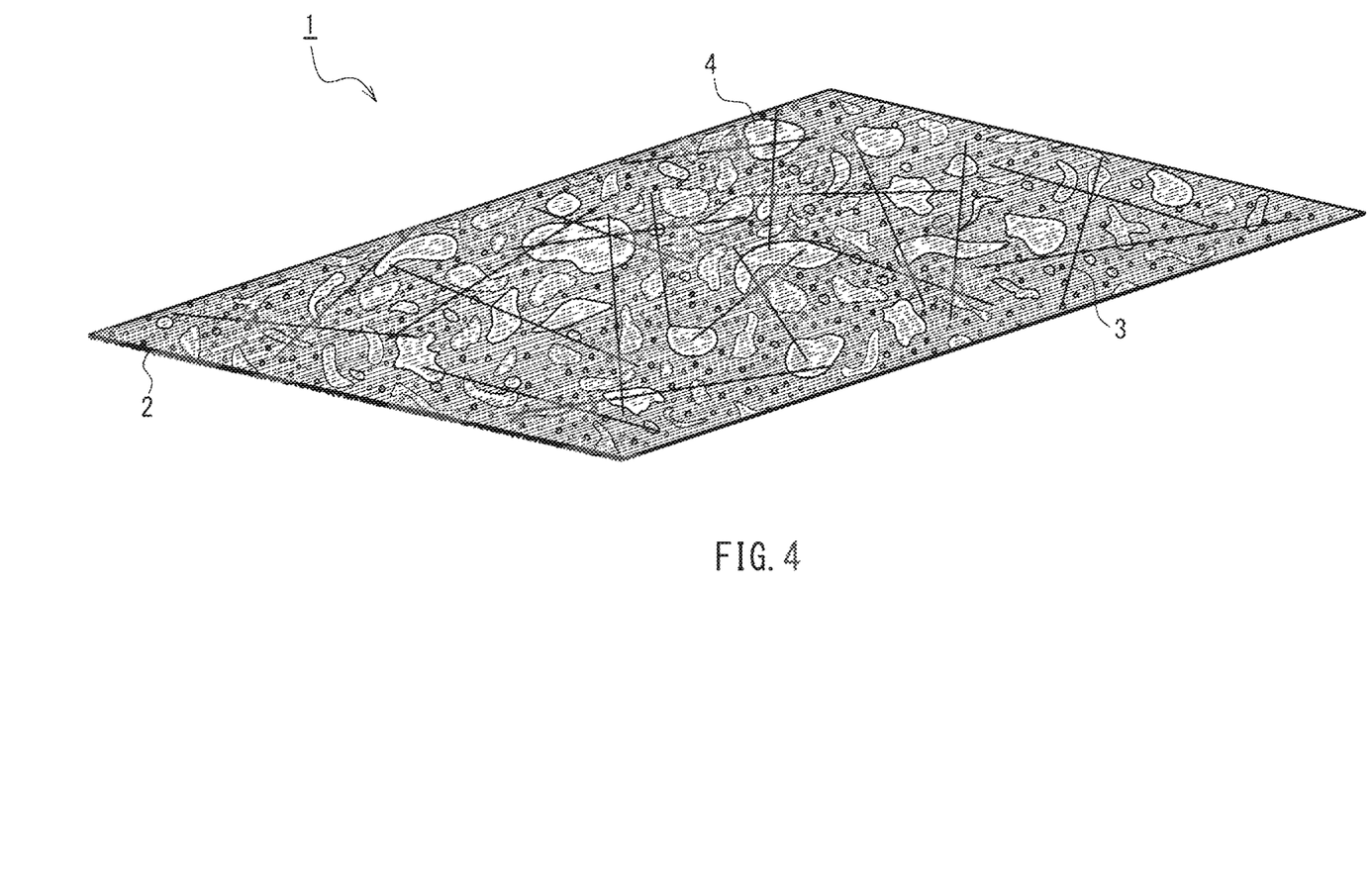
FIG. 4 is a schematic perspective view of a fiber sheet used for molding of a fiber-reinforced resin pultruded product according to an embodiment of the present invention.
Figure 5:
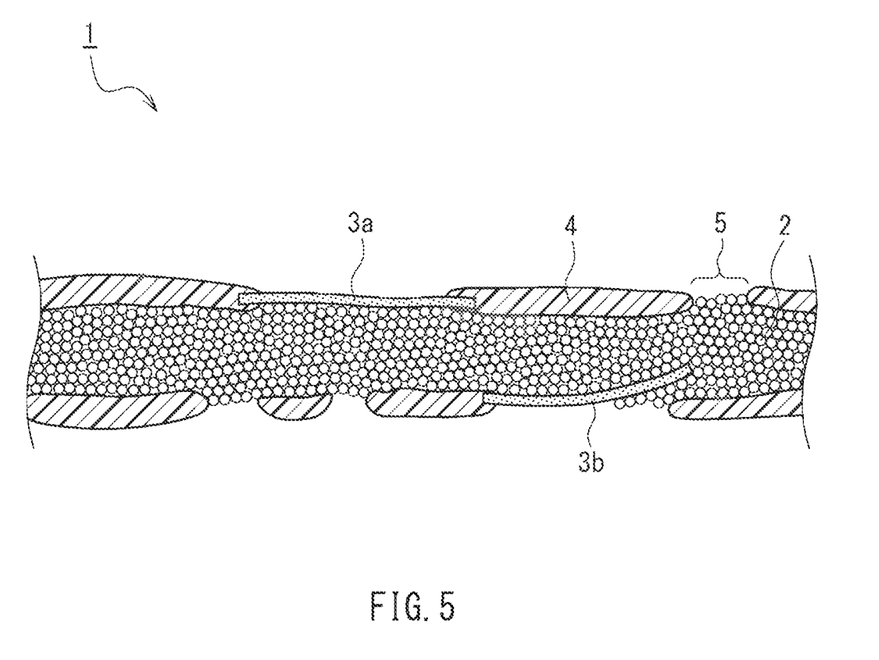
FIG. 5 is a schematic cross-sectional view of the fiber sheet shown in FIG. 4, taken along a width direction thereof.

FIG. 4 is a schematic perspective view of a carbon fiber sheet 1, which is an example of the fiber sheet used in the method for producing a fiber-reinforced resin pultruded product according to an embodiment of the present invention, and FIG. 5 is a schematic cross-sectional view of the carbon fiber sheet 1 shown in FIG. 4, taken along the width direction of the carbon fiber sheet 1. Bridging fibers 3 are arranged extending in various directions on the surface of the spread unidirectional carbon fibers 2. A resin 4 melt-solidified adheres to the surface of the unidirectional carbon fibers 2 and the resin 4 does is not impregnated inside the unidirectional carbon fibers 2 or partially impregnated in the unidirectional carbon fibers 2. The resin 4 bonds and fixes the bridging fibers 3 to the surface of the unidirectional carbon fibers 2. As shown in FIG. 5, bridging fibers 3a and 3b are present on the surface of the unidirectional carbon fibers 2. The entire bridging fiber 3a is located on the surface of the unidirectional carbon fibers 2. The bridging fiber 3b is partially located on the surface of the unidirectional carbon fibers 2 and is partially located inside the unidirectional carbon fibers 2 and cross carbon fibers. The resin 4 bonds and fixes the bridging fibers 3 to the surface of the unidirectional carbon fibers 2. In addition, there are portions to which the resin 4 adheres and portions 5 to which the resin does not adhere. The portions 5 to which the resin does not adhere serve as passages for air inside the fiber sheet to escape when the carbon fiber sheet 1 is being heated and pultruded, facilitating the resin on the surface being impregnated into the entire fiber sheet. The resin 4 thus serves as the matrix resin for the fiber-reinforced resin molded product.

Figure 6:
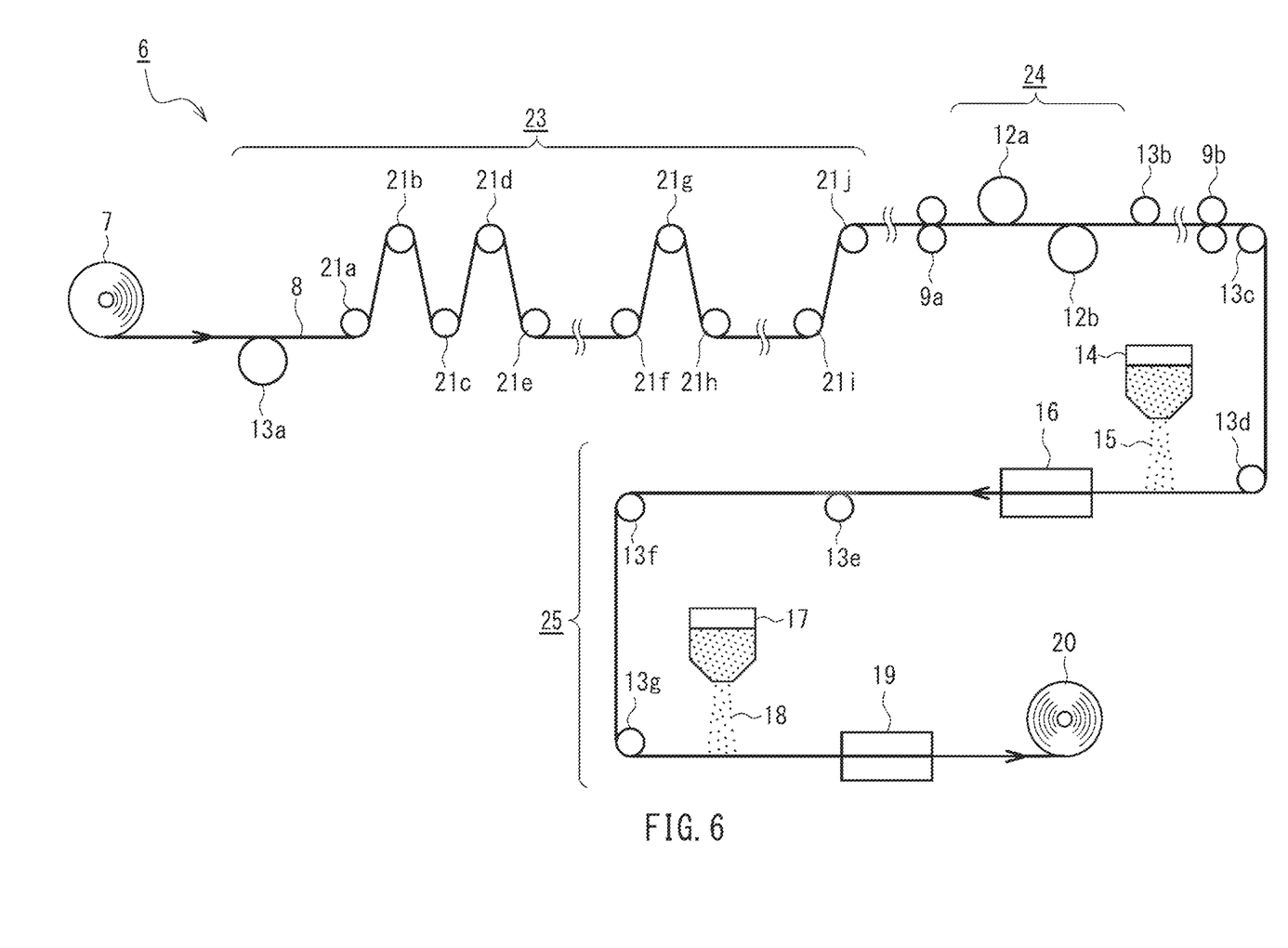
FIG. 6 is a schematic process diagram showing a method for producing the fiber sheet shown in FIG. 4.

FIG. 6 is a schematic process diagram showing a method for producing a carbon fiber sheet according to an embodiment of the present invention. Carbon fiber filament groups (tows) 8 are drawn from multiple feeding bobbins 7, passed through spreader rollers 21a to 21j, and thereby spread (roller spreading step 23). Air spreading may be used instead of roller spreading. The spreader rollers may be fixed or rotated, and may vibrate in the width direction.

After the spreading step, the spread tows are nipped between nip rollers 9a and nip rollers 9b, passed through a plurality of bridge rollers 12a and 12b installed between the nip roller pairs 9a and 9b, and tensioned such that the tow tension is, for example, within a range of 2.5 to 30 N per 15,000 filaments (this number corresponds to a carbon fiber filament group fed from a single feeding bobbin), to produce bridging fibers (bridging fiber producing step 24). The bridge rollers may be rotated, and may vibrate in the width direction. The bridge rollers are, for example, a plurality of rollers with satin, uneven, or mirror-finished surfaces, and produce bridging fibers by performing bending, fixing, rotating, or vibrating, or a combination thereof, on the carbon fiber filament groups. Reference numerals 13a to 13g denote guide rollers.

Then, a dry powder resin 15 is sprinkled onto a surface of the spread fiber sheet from a powder supply hopper 14, and the sheet is fed into and heated in a heating device 16 in an unpressurized state to melt the dry powder resin 15 and then cooled between the guide rollers 13e and 13g. Then, a dry powder resin 18 is also sprinkled onto a back surface of the spread fiber sheet from a powder supply hopper 17, and the sheet is fed into and heated in a heating device 19 in an unpressurized state to melt the dry powder resin 18, cooled, and then taken up onto a take-up roller 20 (powder resin applying step 25). The dry powder resins 15 and 18 are, for example, a polypropylene resin (melting point: 150 to 165° C.), the temperatures in the heating devices 16 and 19 are each set to, for example, 5 to 60° C. above the melting point or the resin flow temperature of the resin, and the residence time is set to, for example, 4 seconds for each heating device. As a result, the spread carbon fiber sheet has a high strength in the width direction and can be handled as a sheet without the constituent carbon fibers coming loose.

To apply a powder resin, powder coating, electrostatic coating, spraying, fluidized bed coating, and other methods can be used. Powder coating, in which a powder resin is dropped onto a surface of a carbon fiber sheet, is preferred. For example, a powder resin in dry powder form is sprinkled onto the spread fiber sheet.

Advantages of the present invention can be summarized as follows.
(1) Since the fiber sheet is not a prepreg sheet but a semi-preg sheet, direct molding is possible. That is, in the present invention, it is not necessary to perform preheating before heating in the heating section.
(2) Since the fiber sheet is not a prepreg sheet but a semi-preg sheet, the fiber sheet has excellent shape-ability and moldability.
(3) In the fiber sheet, the thermoplastic resin in powder form is thermally fused to the fibers, and therefore, spaces between the fibers can be suitably impregnated with the resin. That is to say, unlike a configuration in which a thermoplastic resin in film form is applied, this configuration is excellent in allowing air within the fiber sheet to escape during the molding and therefore suppresses the occurrence of voids. In addition, the use of a thermoplastic resin enables high-cycle molding.
(4) The fibers of the fiber sheet are continuous fibers (not short fibers), like carbon fibers, for example. Therefore, a thin and strong molded product can be obtained.
(5) Since a semi-preg sheet is used in the present invention, the cost can be reduced and molding of a pultruded product can be completed in a short time, compared with a case where a prepreg sheet of a first example or a second example below is used. Specifically, a comparison of the time required to produce a pultruded product is as shown below. The time required to prepare a prepreg sheet is longer than the time required to prepare a semi-preg sheet.

Prepreg Sheet (First Example)

Time required to prepare prepreg sheet+Molding time (including preheating, heating, shaping, and heat-curing time)

Prepreg Sheet (Second Example)

Time required to prepare prepreg sheet+Time required to make prepreg sheet into strips+Molding time (including heating, shaping, and heat-curing time)
<Semi-Preg Sheet>
Time required to prepare semi-preg sheet+Molding time (including heating and shaping time)

As can be seen from the above, the use of a semi-preg sheet can speed up the production of a pultruded product.

EXAMPLES

Hereinafter, the present invention will be described in greater detail using examples. Note that the present invention is not limited to the examples below.

Example 1

(1) Unspread Carbon Fiber Tow
Unspread carbon fiber tows manufactured by Mitsubishi Chemical Corporation (product number: PYROFILE TR 50S15L; shape: regular tow, filament count 15K (15,000 filaments); single fiber diameter: 7 μm) were used. An epoxy compound is attached to carbon fibers of these unspread carbon fiber tows as a sizing agent.
(2) Means for Spreading Unspread Tow
The unspread tows were spread using the spreading means shown in FIG. 6. In the spreading step, the tension of the carbon fiber filament groups (tows) was set to 15 N per 15,000 filaments. In this manner, a spread fiber sheet with a carbon fiber filament count of 15K, a spread width of 500 mm, and a thickness of 0.08 mm was obtained. Bridging fibers accounted for 3.3 mass %.
(3) Semi-Preg Sheet
A polycarbonate (PC) resin powder (manufactured by Teijin Limited, LN 2520 pulverized product, melting point 240° C.) was used as a dry powder resin. The dry powder resin had an average particle size of 320 μm. This resin powder was applied in an average amount of 26.7 g on one side, and 53.4 g on both sides, per 1 $m^2$ of carbon fibers. The temperatures in the heating devices 16 and 19 were each set to 250° C., and the residence time was set to 20 seconds for each heating device. The resulting fiber sheet had a mass of 133.4 g/$m^2$, a fiber volume ratio (Vf) of 32 vol %, and a polycarbonate resin ratio of 50 vol %.
(4) Pultrusion Processing
  A pultruded product was molded using a pultrusion apparatus shown in FIG. 2.
  2 to 3 m of the above-described semi-preg sheet was drawn from a roll and cut off, and the semi-preg sheet was cut to have a width of 350 mm, then folded as desired and fed into the heating section of the die.
  The heated, compressed, and shaped semi-preg sheet was passed through the heated molding section to stabilize the shape.
  The thus molded semi-preg sheet was cooled in the cooling section 36 and thereby fixed.
  The resulting molded product was passed between the pulling rollers 38a and 38b and then cut into pieces each having a length of 150 mm.

Example 2

A polyamide (PA6) resin powder (P101F manufactured by UBE Corporation, melting point 225° C.) was used for a semi-preg sheet. The dry powder resin had an average particle size of 320 µm. This resin powder was applied in an average amount of 24.9 g on one side, and 49.8 g on both sides, per 1 m² of carbon fibers. The temperatures in the heating devices 16 and 19 were each set to 290° C., and the residence time was set to 20 seconds for each heating device. The resulting fiber sheet had a mass of 129.8 g/m², a fiber volume ratio (Vf) of 47 vol %, and a PA6 resin ratio of 50 vol %. This semi-preg sheet was cut to have a width of 400 mm, and then a pultruded product was molded in the same manner as in Example 1, except as shown in Table 1. Tables 1 and 2 collectively show the conditions and results.

TABLE 1

|  | Example 1 | Example 2 |
|---|---|---|
| Resin of semi-preg | PC | PA6 |
| Heating section die temperature (° C.) | 290 | 250 |
| Molding section die temperature (° C.) | 290 | 250 |
| Cooling section die temperature (° C.) (Water-cooling temperature) | 15 | 15 |
| Heating section die diameter (mm) | φ20 → φ6, tapered | φ20 → φ6, tapered |
| Heating section die length (mm) | 50 | 50 |
| Molding section die diameter (mm) | φ6 | φ6 |
| Molding section die length (mm) | 50 | 50 |
| Cooling section die diameter (mm) | φ6 | φ6 |
| Cooling section die length (mm) | 50 | 50 |
| Pulling speed (mm/min) | 72 | 72 |
| Size of molded product, diameter (mm) × length (mm) | φ6 × 150 | φ6 × 150 |

(Evaluation)

Figure 7:
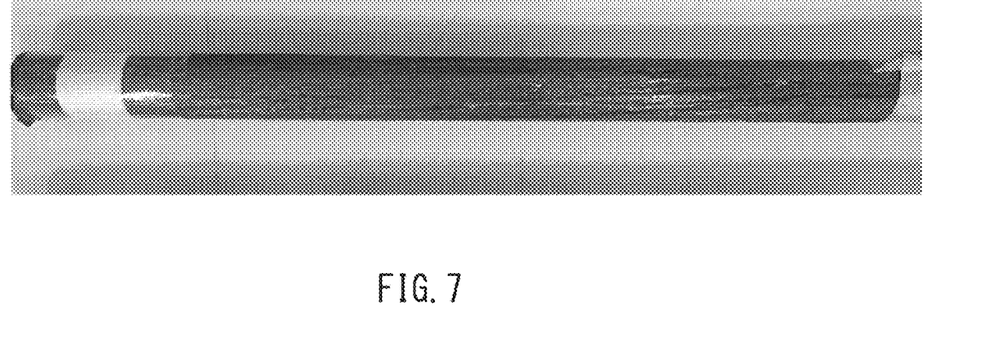
FIG. 7 is a photograph showing an external appearance, when viewed from above, of a fiber-reinforced resin pultruded product obtained in Example 1 of the present invention.
Figure 8:
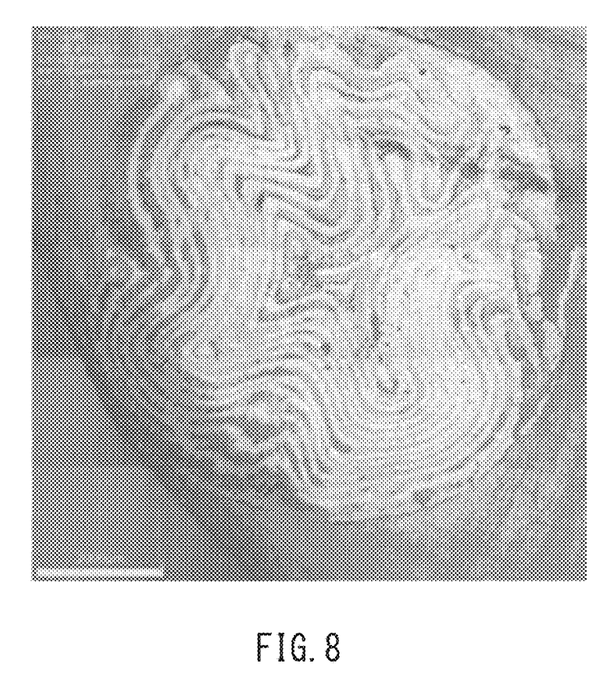
FIG. 8 is a photograph showing an enlarged cross section of the fiber-reinforced resin pultruded product shown in FIG. 7.
Figure 9A:
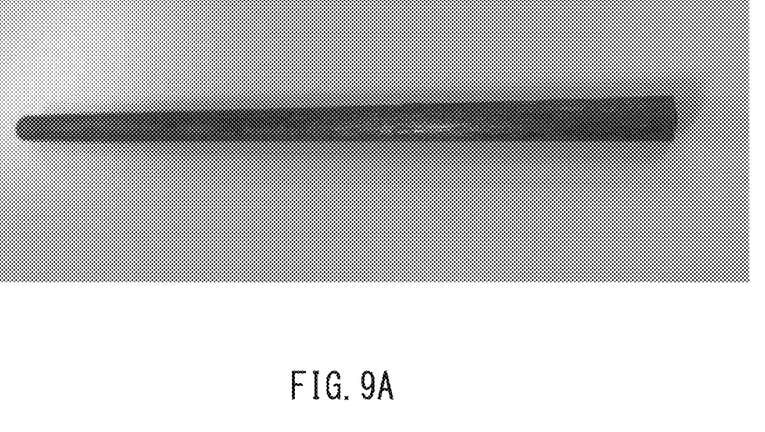
FIG. 9A is a photograph showing an external appearance, when viewed from above, of a fiber-reinforced resin pultruded product obtained in Example 2 of the present invention.
Figure 9B:
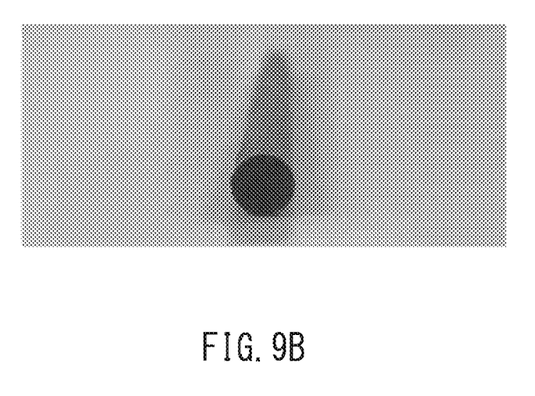
FIG. 9B is a photograph showing an external appearance, when viewed from the front, of the fiber-reinforced resin pultruded product obtained in Example 2 of the present invention.
Figure 10:
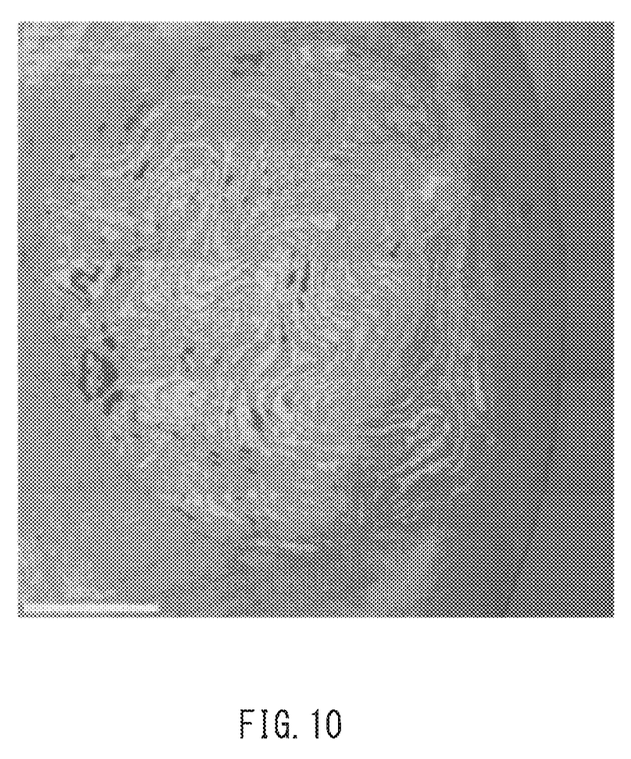
FIG. 10 is a photograph showing an enlarged cross section of the fiber-reinforced resin pultruded product shown in FIG. 9.

(1) FIG. 7 shows a photograph of an external appearance of a molded rod obtained in Example 1, and FIG. 8 shows a photograph of its cross section. FIG. 9A-B show a photograph of an external appearance of a molded rod obtained in Example 2, and FIG. 10 shows a photograph of its cross section. The cross sections of the molded products were observed using a microscope DSX500 manufactured by Olympus Corporation. It was confirmed that the molded rods obtained in Examples 1 and 2 had no problem in terms of external appearance and were of good quality. As for the cross-sectional shapes, although traces of the sheet shape were observed, there were few voids, and good impregnation and molding were achieved. Inside the molded products, the fiber sheets were folded into an irregular shape. Furthermore, there were pultrusion marks on the surface of the molded rods, and at least some of the fibers constituting the fiber sheets were present on the surface.

(2) Evaluation of Physical Properties

Conditioning: A specimen was left under conditions of a temperature of 23° C. and a relative humidity of 50% for 48 hours or longer before a three-point bending test was performed. The three-point bending test was performed in conformity with JIS K7074, and the maximum stress was measured. A precision universal testing machine AG-50k NXD plus manufactured by Shimadzu Corporation was used. Here, according to JIS K7074-1988, the flexural modulus is calculated using a calculation formula that assumes the use of a flat plate as a test specimen. For this reason, assuming that the cross-sectional area of a round bar and the cross-sectional area of a flat plate are equal, the elastic modulus was calculated by converting to the cross-sectional area of a round bar to that of a flat plate.

Table 2 shows the measurement results.

TABLE 2

|  | Example 1 | Example 2 |
|---|---|---|
| Resin of semi-preg | PC | PA6 |
| Fiber Vf (vol %) | 32 | 47 |
| Maximum stress (MPa) | '121 | 290 |
| Elastic modulus (GPa) | 22 | 35 |

As is clear from Table 2, the molded products of Examples 1 and 2 had favorable maximum stresses and elastic moduli.

From the above-described results, it was confirmed that, even when the method in which impregnation and molding are simultaneously performed using a semi-preg sheet was used, linear objects like rod wires could be produced. Since the semi-preg sheet used in the present invention is substantially not impregnated with resin and is a sheet in which a resin in powder form is melt-bonded and fixed to the surface of the sheet, the semi-preg sheet has extremely high flexibility and, unlike a prepreg sheet, does not require treatment such as heat treatment before molding. Accordingly, the semi-preg sheet used in the present invention has excellent handleability and can be controlled by adjusting the heating temperature and the pulling speed, and preferably the die diameter.

Example 3

A pultruded product was molded in the same manner as in Example 1, except that a polyphenylene sulfide (PPS) resin (melting point 278° C.) was used as the dry powder resin for the semi-preg sheet, and the ratio (Vf) of carbon fibers was set to 45 vol %. The resulting rod had a diameter of 6 mm and a length of 150 mm. Table 3 shows data on physical properties of this rod as compared with iron (SS400) and aluminum (duralumin). Note that the flexural strength and the flexural modulus in Table 3 are values measured or calculated in conformity with JIS K7074, and the flexural strength is synonymous with the maximum stress in Table 2 above.

TABLE 3

|  | Example 3 | Iron (SS400) | Aluminum (duralumin) |
|---|---|---|---|
| Density g/cm³ | 1.5 | 7.8 | 2.8 |
| Flexural modulus GPa | 87 | 205 | 74 |
| Flexural strength MPa | 543 | 450 | 423 |
| Specific flexural modulus (Flexural modulus/Density) | 58 | 26.3 | 26.4 |
| Specific flexural strength (Flexural strength/Density) | 362 | 57.7 | 151.1 |

It is clear from Table 3 that the rod obtained in Example 3 was lightweight and had a high flexural strength.

INDUSTRIAL APPLICABILITY

The fiber-reinforced resin pultruded product of the present invention can be used as rods, shafts, frames, plates, cables, and the like, and can be made in any cross-sectional shapes, such as a round shape, a rectangular shape, an H shape, and an L shape. Thus, the present invention can be widely used in applications such as aviation, space, automobiles, sports, three-dimensional printers, industrial applications, building materials, windmills, bicycles, railroads, ships, and the like.

DESCRIPTION OF REFERENCE NUMERALS

1 Carbon fiber sheet
2 Unidirectional carbon fiber
3, 3a, 3b Bridging fiber
4 Resin
5 Portion to which resin does not adhere
6 Spreading device
7 Feeding bobbin
8 Carbon fiber filament group (Unspread carbon fiber tow)
9a, 9b Nip roller
12a, 12b Bridge roller
13a to 13g Guide roller
14, 17 Powder supply hopper
15, 18 Dry powder resin
16, 19 Heating device
20 Take-up roller
21a to 21j Spreader roller
23 Roller spreading step
24 Bridging fiber producing step
25 Powder resin applying step
30, 40 Fiber-reinforced resin pultruded product
31 Cross section showing impregnation and integration with thermoplastic resin
32, 41 to 43 Fiber sheet
33 Guide
34 Heating section
35 Molding section
36 Cooling section
37 Die
38a, 38b Pulling roller
39 Blade

The invention claimed is:

1. A fiber-reinforced resin pultruded product obtained by molding a fiber sheet,
wherein the fiber sheet is a semi-preg sheet in which a thermoplastic powder resin serving as a matrix is fused to at least a fiber surface, and
the fiber-reinforced resin pultruded product is a solid molded product in which the fiber sheet has been pultruded, the fiber sheet inside the molded product is folded into an irregular shape, and the thermoplastic resin fills an inside of the fiber sheet and spaces between overlapping portions of the fiber sheet and is integrated with the fiber sheet.

2. The fiber-reinforced resin pultruded product according to claim 1, wherein the fiber sheet includes unidirectional continuous fibers obtained by spreading a group of continuous fibers and aligning the continuous fibers in parallel in one direction, and the thermoplastic resin that is present on at least a surface of the unidirectional continuous fibers.

3. The fiber-reinforced resin pultruded product according to claim 2, wherein the fiber sheet includes bridging fibers extending in a direction in which the bridging fibers cross the unidirectional continuous fibers, and the thermoplastic resin integrates the unidirectional continuous fibers with the bridging fibers.

4. The fiber-reinforced resin pultruded product according to claim 1, wherein the fiber-reinforced resin pultruded product contains fibers in a ratio of 25 to 70 vol % and the resin in a ratio of 30 to 75 vol %.

5. The fiber-reinforced resin pultruded product according to claim 1, wherein a fiber constituting the fiber sheet is at least one selected from a carbon fiber, a glass fiber, and a highly elastic fiber with an elastic modulus of 380 cN/dtex or more.

6. The fiber-reinforced resin pultruded product according to claim 1, wherein the fiber sheet has a mass per unit area of 10 to 500 g/m$^2$.

7. A method for producing a fiber-reinforced resin pultruded product in which a fiber sheet is used,
the fiber sheet being a semi-preg sheet in which a thermoplastic powder resin serving as a matrix is fused to at least a fiber surface,
the method comprising:
converging the fiber sheet and feeding the fiber sheet into a heating section of a pultrusion die;
compressing the fiber sheet while heating the fiber sheet to a temperature equal to or above a melting point or a resin flow temperature of the thermoplastic resin in the heating section;
molding the fiber sheet in a molding section of the pultrusion die;
cooling the fiber sheet in a cooling section of the pultrusion die to obtain a pultruded product; and
pulling the pultruded product out of the pultrusion die,
wherein the fiber-reinforced resin pultruded product is a solid molded product in which the fiber sheet inside the molded product is folded into an irregular shape, and the thermoplastic resin fills an inside of the fiber sheet and spaces between overlapping portions of the fiber sheet and is integrated with the fiber sheet.

8. The method for producing a fiber-reinforced resin pultruded product according to claim 7, wherein the fiber sheet is fed into the heating section while being converged in at least one state selected from a folded state, a rolled-up state, and a state in which strip-shaped sheets are stacked.

9. The method for producing a fiber-reinforced resin pultruded product according to claim 7, wherein an inlet diameter (D1) of a die of the heating section/an outlet diameter (D2) of the heating section is 1.5 times or greater.

10. The method for producing a fiber-reinforced resin pultruded product according to claim 7, wherein the steps from the feeding to the pulling are performed as a continuous process.

11. The method for producing a fiber-reinforced resin pultruded product according to claim 7, wherein the pultruded product that has been pulled out is taken up or cut to a predetermined length.

* * * * *